(12) United States Patent
Salmon et al.

(10) Patent No.: US 11,904,420 B2
(45) Date of Patent: Feb. 20, 2024

(54) METHOD FOR MANUFACTURING A TURBOMACHINE COMPRESSOR BLADE BY COMPACTING

(71) Applicant: SAFRAN AIRCRAFT ENGINES, Paris (FR)

(72) Inventors: Jérôme Salmon, Moissy-Cramayel (FR); Alexandre Gimel, Moissy-Cramayel (FR); Christophe Gleize, Moissy-Cramayel (FR); Axel Pereira, Moissy-Cramayel (FR); Jean François Richard, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/030,425

(22) PCT Filed: Sep. 30, 2021

(86) PCT No.: PCT/FR2021/051695
§ 371 (c)(1),
(2) Date: Apr. 5, 2023

(87) PCT Pub. No.: WO2022/074314
PCT Pub. Date: Apr. 14, 2022

(65) Prior Publication Data
US 2024/0017362 A1    Jan. 18, 2024

(30) Foreign Application Priority Data

Oct. 6, 2020 (FR) ..................................... 2010179

(51) Int. Cl.
*B23P 15/04* (2006.01)
*B21D 53/78* (2006.01)
(Continued)

(52) U.S. Cl.
CPC .............. *B23P 15/04* (2013.01); *B21D 53/78* (2013.01); *B23K 20/021* (2013.01);
(Continued)

(58) Field of Classification Search
CPC ....... F16D 2200/0021; F16D 2200/003; F16D 2250/023; F16D 2250/0076;
(Continued)

(56) References Cited

U.S. PATENT DOCUMENTS 3,825,984 A * 7/1974 Linko ..................... B23P 15/04
                                                       29/889.721
3,846,041 A * 11/1974 Albani ................... F01D 5/189
                                                       416/96 A
(Continued)

FOREIGN PATENT DOCUMENTS

| WO | 2009/039282 A1 | 3/2009 |
| WO | 2011/114073 A1 | 9/2011 |
| WO | 2020/128242 A1 | 6/2020 |

OTHER PUBLICATIONS

International Search Report dated Feb. 3, 2022 issued in International Application No. PCT/FR2021/051695.
French Search Report dated Jun. 17, 2021 issued in FR 2010179.

*Primary Examiner* — Jason L Vaughan
(74) *Attorney, Agent, or Firm* — Sughrue Mion, PLLC (57) ABSTRACT

The invention relates to a method for producing a turbomachine compressor blade, comprising the following steps:— installing primary pins (26) comprising a material other than a titanium-based alloy in primary bores (20) of a core, the primary bores forming at least one polygon, and installing a secondary pin made of titanium-based alloy in a secondary bore of the core; —producing a stack (2) of a suction-face sheet (4), a core (14) and a pressure-face sheet (6); —compacting the stack; —removing the primary pins (26) from the primary bores (20); —removing the secondary pin from (Continued)

the secondary bore; and—taking the core (14) away from the stack.

11 Claims, 5 Drawing Sheets (51) Int. Cl.
B23K 20/02 (2006.01)
F01D 5/28 (2006.01)

(52) U.S. Cl.
CPC .............. B23K 20/023 (2013.01); F01D 5/28 (2013.01); *F05D 2230/64* (2013.01); *F05D 2300/174* (2013.01)

(58) Field of Classification Search
CPC ..... F16D 2250/0084; F16D 2250/0092; B23P 15/04; B21D 53/26; B23K 9/007
See application file for complete search history.

(56) References Cited

U.S. PATENT DOCUMENTS

| | | | | |
|---|---|---|---|---|
| 4,223,429 | A * | 9/1980 | Robinson | B23P 15/04 29/889.71 |
| 4,249,291 | A * | 2/1981 | Grondahl | B23P 15/04 228/183 |
| 4,283,835 | A * | 8/1981 | Obrochta | B29C 45/14065 425/129.1 |
| 6,003,754 | A * | 12/1999 | Rhodes | B23K 31/02 228/5.5 |
| 8,231,354 | B2 * | 7/2012 | Campbell | F01D 5/147 416/193 A |
| 8,256,661 | B2 * | 9/2012 | VanDyke | B23P 15/04 228/234.1 |
| 9,199,345 | B2 * | 12/2015 | Flesch | F01D 5/282 |
| 10,006,435 | B2 * | 6/2018 | Stoer | B23P 15/04 |
| 10,730,151 | B2 * | 8/2020 | Parkin | B23P 15/04 |
| 2013/0312261 | A1 * | 11/2013 | Godon | F01D 5/147 29/889.71 |

* cited by examiner

METHOD FOR MANUFACTURING A TURBOMACHINE COMPRESSOR BLADE BY COMPACTING

CROSS REFERENCE TO RELATED APPLICATIONS

This application is a National Stage of International Application No. PCT/FR2021/051695 filed Sep. 30, 2021, claiming priority based on French Patent Application No. 2010179 filed Oct. 6, 2020, the contents of each of which being herein incorporated by reference in their entireties.

FIELD OF THE INVENTION

The invention relates to the manufacturing of turbomachine blades by pressing, particularly the manufacturing of turbomachine compressor blades.

PRIOR ART

The so-called "leading edge formed on a core" manufacturing technique is known. It is for example known from the document WO-2011/114073. It involves the manufacturing of a turbomachine compressor blade, for example for an airplane turbojet engine. It is conventional for such a blade to comprise an upper wing surface, a lower wing surface, a leading edge and a trailing edge.

In the method, an upper wing skin, a core and a lower wing skin are stacked. The core is thus interposed between the two skins and will serve to define an inner volume of the blade at the level of its leading edge. Hot Isostatic Pressing (HIP) of the stack is then carried out. During this operation, the two skins closely fit the shape of the core, so that it gives them a final shape. The core must then be removed from the stack, the core now being encapsulated between the two skins. This operation is a so-called "coring" operation. The core will then be re-used for the manufacturing of a new blade.

Prior to the pressing operation, pins are inserted into bores made in the core. The pins have been chosen and fitted as follows.

One of the pins is made of a titanium-based alloy. It will referred to in the remainder of the text as a "titanium pin". It is used to create a point of affinity between the core and the titanium and allows for homogeneous removal. It is welded to the lower and upper wing skins by diffusion welding. It is dimensioned to be in overlength to leave a visual imprint after pressing. During the HIP, under the effect of pressure, this pin deforms and is crimp-fitted in the core.

The four other pins are made of a different material from the previous one, for example nickel-based. They are aligned roughly parallel to a longitudinal edge of the stack. They make it possible to close the corresponding bores which then serve to clamp the stack during the machining that follows the pressing. They, too, are dimensioned to leave a visual imprint after pressing of the titanium coating around the core. These pins resist the pressure during the HIP and do not deform. The bore receiving the titanium pin is located at a distance from the line defined by these four pins. This line extends between the titanium pin and the longitudinal edge.

After the pressing and before the removal of the core, the pins must therefore be removed. The coring operation can thus be broken down into two phases. The first, so-called unpinning phase, consists in freeing up the bores located on the core. These bores will subsequently make it possible to create a frame of reference and areas of clamping of the assembly. The second constitutes the coring in the strict sense, which makes it possible to separate the coating and the core.

To withdraw the four aforementioned pins, a first machining operation is carried out, consisting in clearing away the titanium facing the pins to free up their way out, then in tapping them out to extract them from the core. To do so, a first operation of setting (the accurate installation of the assembly on a support) of the stack is carried out.

The difficulty then lies in the withdrawal of the titanium pin. Bearing in mind that it is crimp-fitted into the core, the only option is the removal of the pin by machining. But this operation must under no circumstances compromise the integrity of the core. To do this it is therefore necessary to locate the pin with accuracy. And drilling the titanium pin without the risk of impacting the core requires perpendicularity between the main face of the stack and the centerline of this bore.

For this purpose it is therefore necessary to carry out a new setting which must be especially rigorous. This second setting is carried out by immobilizing the stack on a support by means of the four bores now freed up. However, these bores are substantially aligned with one another and also very far from the center of gravity of the core. It is therefore difficult to attach the stack with accuracy and soundness on its support. In addition, since these four pins are substantially aligned, they do not allow for robust and accurate straightening of the stack with respect to the main face of the core which serves as a reference face during the removal of the titanium pin.

It can therefore be seen that this method gives rise to two technical drawbacks:
  it requires two meticulous setting operations to perform the unpinning by machining, and
  it does not eliminate the risk of impacting the core during the machining of the titanium pin and therefore having to discard the core.

SUMMARY OF THE INVENTION

For this purpose, provision is made for a method for manufacturing a turbomachine blade, the method comprising the following steps:
  installing primary pins comprising a material other than a titanium-based alloy in primary bores of a core, the primary bores forming at least one polygon, and installing a secondary pin made of a titanium-based alloy in a secondary bore of the core,
  making a stack of an upper wing skin, the core and a lower wing skin,
  pressing the stack,
  removing the primary pins from the primary bores,
  removing the secondary pins from the secondary bore, and
  taking the core out of the stack.

This method is particularly useful to define an inner volume of the blade at the level of its leading edge.

The definition of a polygon by the primary bores allows them to define a much more accurate and stable frame of reference on the face of the core allowing the attachment of the stack on the support once these bores have been freed from their pins. The invention therefore procures an increase in the bearing surface intended to make the immobilization of the core on the tooling more robust. This frame of reference further allows the straightening of the face on which bearing is taken to machine the titanium pin. This solution therefore procures a dimensional robustness that was not previously achievable.

In addition, a single setting operation is now enough to remove the primary pins. The withdrawal of the titanium pin can then take place, once the part is mounted on the tooling provided for the extraction of the core. Since it makes it possible to go from two settings to a single one, the invention makes it possible to reduce cycle times.

The invention does not require any major modification of the elements (core, support and tooling) used in the method of the prior art. They are kept and adapted simply and quickly to this new solution.

The term "titanium-based alloy" should be understood to refer to an alloy in which titanium forms at least 50% in weight of the alloy.

In an embodiment, at least one of the primary and secondary pins comprises a shank having a longitudinal shaft and a head protruding from the shank along a direction radial to the shaft.

The pin thus has a flange and can be described as a "shoulder pin". During machining it hence has the purpose of freeing up not only the bore area but also a circular surface at the periphery of the bore. This frees up a part of the bearing face of the core, which is the reference surface for the coring operation. The assembly is therefore pressed flat against the core and not against the skins. This freeing up of flat circular surfaces coaxial to the bores makes it possible to define an even more accurate and stable frame of reference on the face of the core allowing the attachment of the stack on the support once these bores have been freed from their pins. In other words, owing to the geometry of the shoulder pin, the hole and a circular surface at the hole periphery are freed up. This freed-up hole makes it possible to find the bearing face of the core, which is the reference face for the coring operation. With a headless pin, the assembly is not pressed flat against the core but against the titanium coating, which is less accurate.

Advantageously, the method comprises, after the step of pressing the stack, the following steps in the following order:
immobilizing the stack with respect to the support,
carrying out the primary step while the stack is immobilized on the support,
immobilizing the stack on a tooling by means of attaching members traversing the primary bores, and
while the stack is immobilized, carrying out the steps of removing the secondary pin and taking out the core.

In an embodiment, the secondary bore extends inside the polygon.

This procures particularly good stability of the attachment of the stack to the tooling by means of the primary bores as close as possible to the titanium pin.

Provision can be made for the stack to comprise a straight longitudinal edge, the secondary bore and a first of the primary bores extending in one and the same plane perpendicular to the longitudinal edge, the secondary bore extending between the first of the primary bores and the edge.

Provision can be made for the secondary bore and the first of the primary bores to be separated by a distance of at least 10 mm.

It is specifically preferable for these two bores not to be too close to one another so that the two skins properly fit the shape of the core all around the pins in question.

Provision can also be made for the method to comprise at least one of the following features:
the primary pins are odd in number,
the primary pins are at least two in number, and
the step of pressing the stack implements Hot Isostatic Pressing.

It can specifically be seen here that the method of the invention is not limited to such a pressing.

Provision can also be made according to the invention for a stack comprising:
an upper wing skin,
a core,
a lower wing skin,
primary pins comprising a material other than a titanium-based alloy housed in primary bores of the core and forming at least one polygon, and
a secondary pin made of a titanium-based alloy housed in a secondary bore of the core.

This can concern either the stack before the pressing operation or the stack after this operation.

Advantageously, at least one of the primary and secondary pins comprises a shank having a longitudinal shaft and a head protruding along a direction radial to the shaft.

DESCRIPTION OF THE FIGURES

We will now describe an embodiment of the invention by way of non-limiting example with reference to the drawings wherein.

Figure 1:
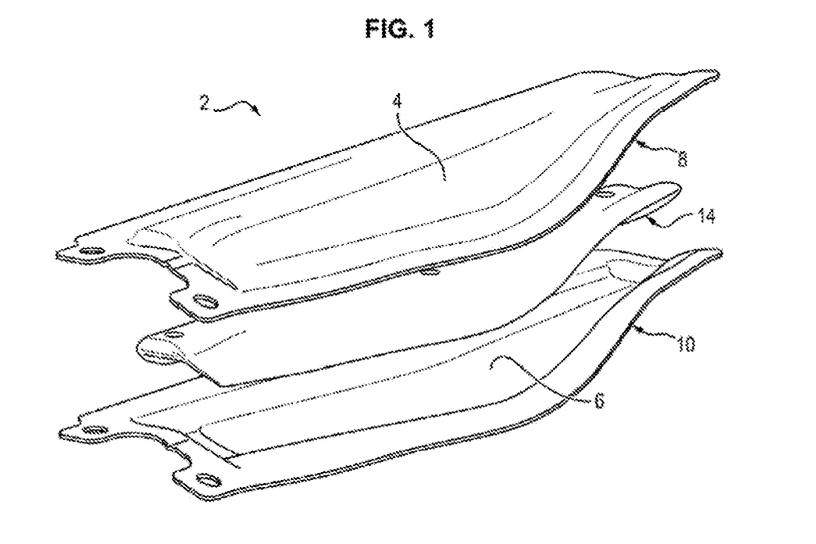
FIG. 1 is an exploded perspective view showing the three layers of the stack in a method of implementation of the method of the invention.

We will therefore describe a method of implementation of the method of the invention which concerns the manufacturing of a turbomachine compressor blade, for example of an airplane turbojet engine. The blade 2, shown in the form of the stack in FIG. 1, comprises an upper wing skin or wall 4, a lower wing skin or wall 6, a leading edge 10 and a trailing edge 8.

In a first step, the core only is considered.

The core 14 is for example made of the material marketed under the brand name "Waspaloy" by United Technologies Corp.

Figure 2:
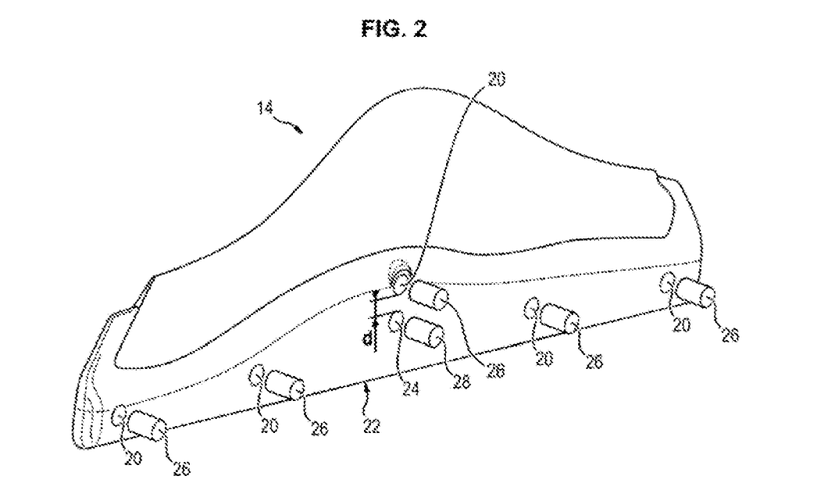
FIGS. 2 to 4 are three views of the core of the stack of FIG. 1.

As illustrated in FIG. 2 which shows only the core, the core comprises primary bores which are here odd in number, five in number in this example. Four of them are aligned roughly parallel to a straight longitudinal lower edge 22 of the core, at a short distance from this edge.

The fifth primary bore 20 extends in the center of gravity of the core, or in the vicinity of it, in the median area of one of the main faces of the core. If one considers the geometrical projection of each of the primary bores 20 on the longitudinal edge 22, these bores are evenly spaced along this edge. The two bores located at the ends of the row are located in proximity to the respective ends of this edge.

Figure 3:
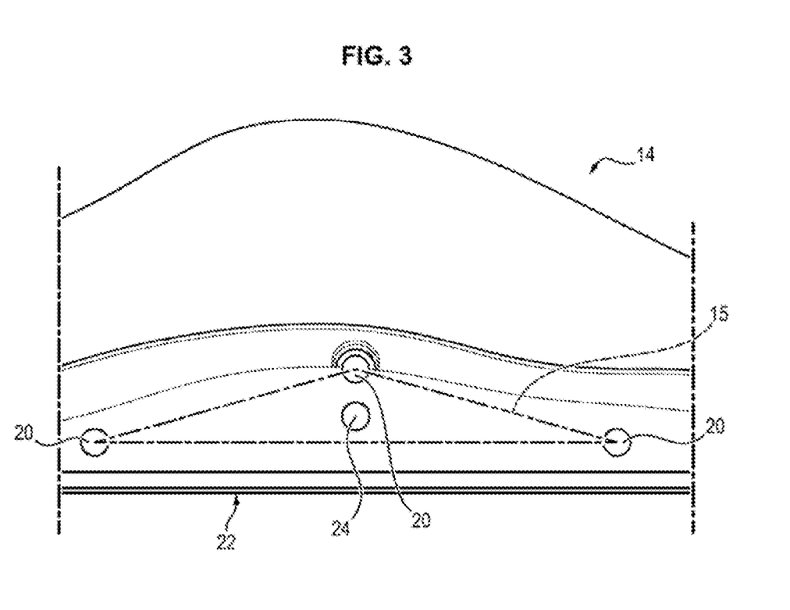

Bearing in mind that this fifth primary bore extends at a distance from the line defined by the four other primary bores, these five bores 20 together define several polygons formed by triangles. FIG. 3 thus visualizes the triangle 15 formed by the three primary bores 20 located in the median area of the core.

The core 14 also comprises a secondary bore 24 separate from the preceding ones. It is located inside this triangle 15, between on the one hand the line defined by the four aligned primary bores and on the other hand the fifth primary bore.

Figure 4:
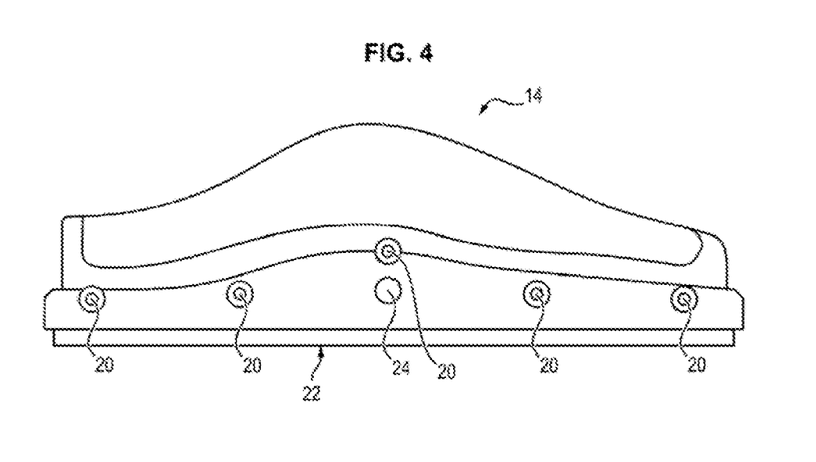

The secondary bore 24 and this fifth primary bore 20 extend in one and the same plane P perpendicular to the longitudinal edge 22, the secondary bore 24 extending between the fifth primary bore 20 and the edge 22. This plane P is visible in the section in FIG. 4. It is perpendicular to the plane of the figure. The secondary bore 24 and this primary bore are separated by a distance d of at least 10 mm indicated in FIG. 2.

The primary 20 and secondary 24 bores each traverse the core 14.

Five primary shouldered pins 26 are installed in the respective primary bores 20. These pins are made of a material other than a titanium-based alloy. They are for example made of a nickel-based material or made of the aforementioned material marketed under the brand name Waspaloy or made of one of those marketed under the brand name Inco by Special Metals Corporation. These pins 26 are used to close off the corresponding bores 20 of the core which are then used for the clamping of the stack during the machining that follows the pressing. The pins 26 are overlong, for example by 0.5 mm, with respect to the length of the bore 20 of the core to leave a visual imprint after pressing of the titanium coating around the core.

Figure 11:
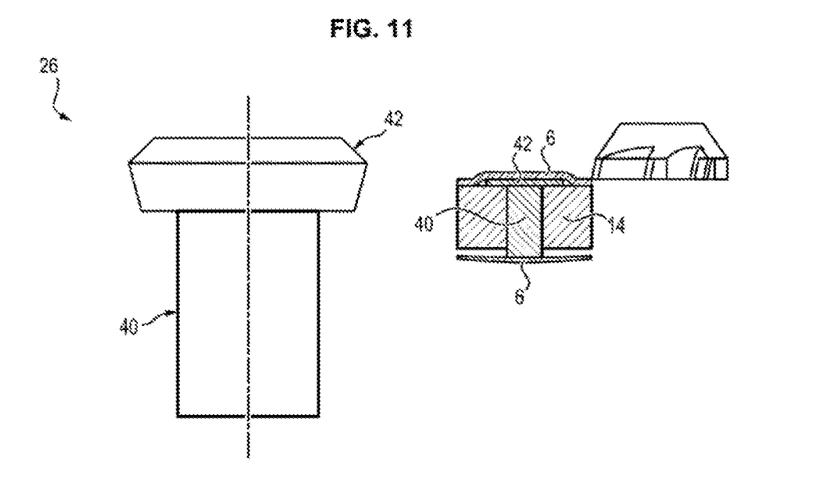
FIG. 11 shows axial views of one of the pins before and after crimping.

In addition, as illustrated in FIG. 11, the primary pins 26 are shouldered in order to cover a peripheral bearing surface on the core, located in the centerline of the bores on the upper wing skin side 4, as illustrated in the right-hand part of FIG. 11. More accurately, each primary shouldered pin 26 comprises a shank 40, here cylindrical, having a longitudinal shaft and a head 42 protruding from the shank along a direction radial to the shaft. The head 42 thus forms a flange.

A secondary pin 28 made of a titanium-based alloy, for example the alloy TA6V, is also installed in the secondary bore 24 of the stack. This pin is also shouldered. It makes it possible to create a point of affinity between the core 14 and the pin and allows for homogeneous withdrawal. It is welded to the core by diffusion welding. It is also dimensioned to be overlong, for example by 0.5 mm, with respect to the length of the bore of the core to leave a visual imprint after pressing.

Next, the upper wing skin 4, a core 14 and the lower wing skin 6 are stacked. The core 14 is interposed between the two skins 4 and 6 and will serve to define an inner volume of the blade at the level of its leading edge 8.

The bores are formed in the core 14 only, so that the pins are encapsulated in the lower and upper wing skins. The first step of the method is therefore the installation of the pins, the second step the stacking of the skins and the core, the third the pressing.

Next, the stack is pressed, here by carrying out Hot Isostatic Pressing (HIP). During this operation, the two skins closely fit the shape of the core 14 so that the core gives them their final shape. During the HIP, under the effect of pressure, the secondary pin 28 deforms and becomes crimp-fitted into the core. The same applies for the primary pins 26.

Figure 5:
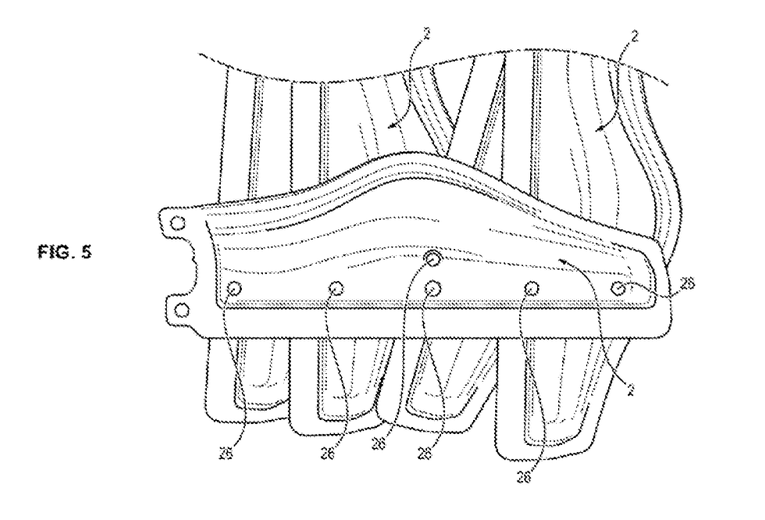
FIG. 5 is a perspective view showing several stacks after pressing in the context of this method of implementation.

Stacks resulting from the pressing are illustrated in FIG. 5. It can be seen that, before and after the pressing, a stack 2 is present comprising:
an upper wing skin 4,
a core 14,
a lower wing skin 6,
primary pins 26 comprising a material other than a titanium-based alloy housed in the primary bores 20 of the core forming a polygon 15, and
a secondary pin 28 made of a titanium-based alloy housed in a secondary bore 24 of the core.

After the pressing and prior to the withdrawal of the core, the pins must be removed, particularly those of the core, during the unpinning step.

To do this, the stack 2 is immobilized with respect to a non-illustrated support, after an operation of setting it on the support.

Figure 6:
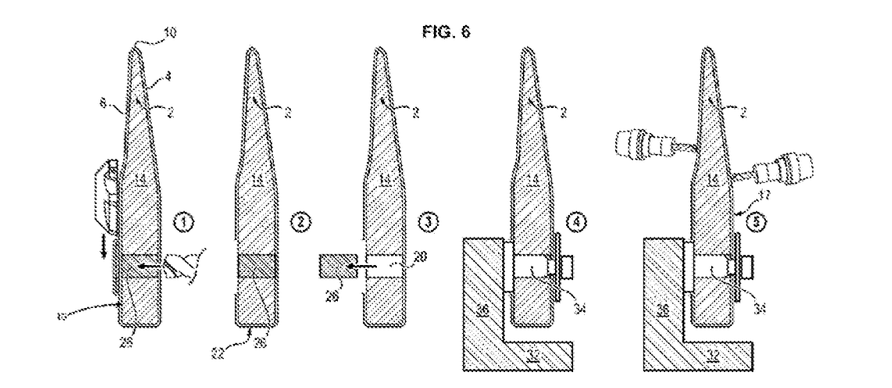
FIGS. 6 and 7 are views showing several steps of this method of implementation of the method.

Then the primary pins 26 are removed from the primary bores 20. For this purpose, as illustrated in FIGS. 6 and 11, a first operation is carried out of machining the side of the stack bearing the heads of the pins. During this step, the titanium of the skin is cleared facing the pins 26 to free up their way out, over a volume contained between the face 19 of the core 14 against which the head 42 is bearing and the apex of the head. On this occasion, the head is removed.

Figure 7:
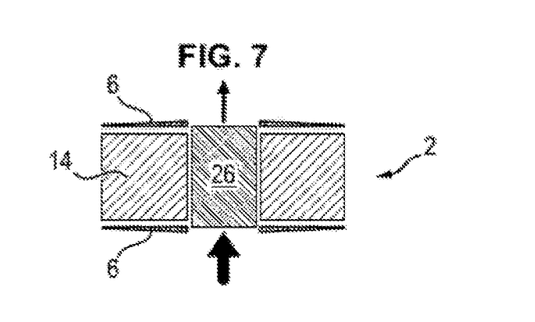

Next, the pins 26 are tapped out to extract them from the core and from the stack, as illustrated in FIGS. 6 and 7.

Figure 8:
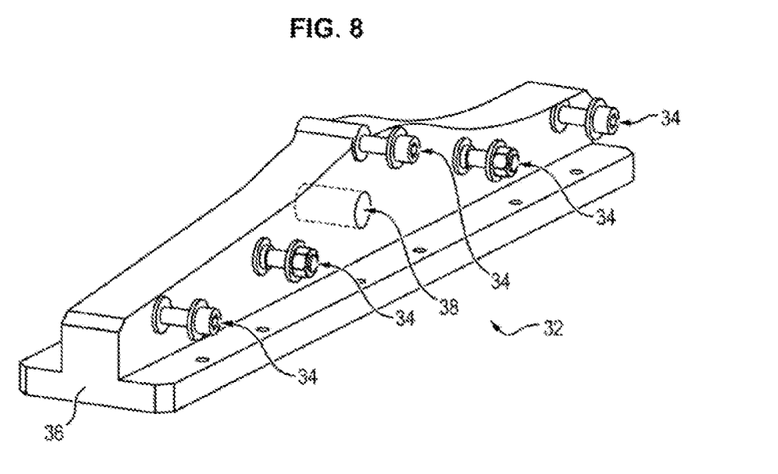
FIG. 8 is a view of a tooling used in the context of this implementation.

Next, the stack 2 of the support is freed up and this time it is immobilized on a tooling 32 illustrated particularly in FIG. 8 by means of attaching members 34 traversing the respective primary bores 20 and the corresponding bores of a jig 36 of the tooling in order to rigidly attach the stack 2 to the jig 36. The primary bores 20 thus make it possible to create a frame of reference and areas of clamping of the stack. The areas of the face 19 initially located under the heads 42 thus also serve as a frame of reference.

Figure 9:
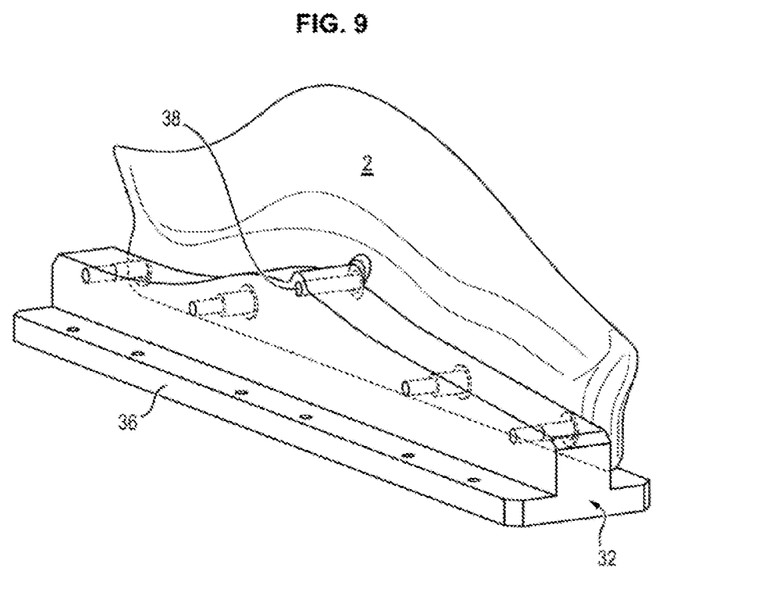
FIGS. 9 and 10 show the stack attached to this tooling.
Figure 10:
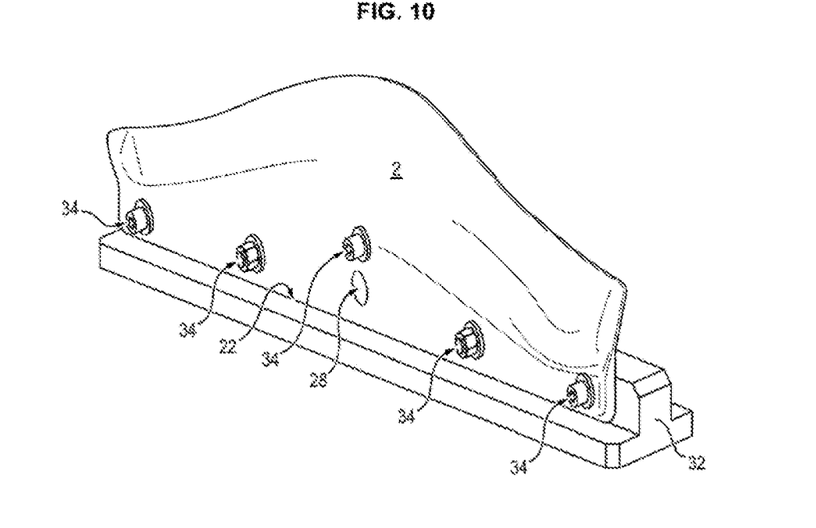

While the stack is thus immobilized, the secondary pin 28 of the secondary bore 24 is removed by machining. For this purpose, the jig comprises an additional bore 38 visible in FIGS. 8 to 10 and coinciding with the secondary bore 28 of the stack. This additional bore makes it possible to introduce a tool for machining the secondary pin through the jig.

This removal can be carried out without difficulty and without compromising the integrity of the core since the pin can be located with accuracy. It is also possible to drill the titanium pin without the risk of impacting the core since the stable attachment of the stack 2 to the jig 36, procured by the arrangement of the primary bores 20 and the direct bearing on the face of the core, ensures perpendicularity between the main face 17 of the stack, visible in FIG. 6, and the centerline of this bore. This same attachment allows a robust and accurate straightening of the stack with respect to the main face 17 which serves as a reference face during the removal of the pin.

Once the secondary bore has been freed up, the core 14 can be removed from the stack and the coring in the strict sense can be performed, which makes it possible to separate the coating and the core.

The question arises of whether the choice of the position of the point of affinity between the titanium coating and the core has an effect on the geometry of the leading edge during the pressing. It has been found that this is not the case.

Although the invention is implemented here with an additional secondary pin by comparison with the prior art, the cost of this pin is negligible in relation to the cost of production of the part.

Of course, many modifications may be made to the invention without departing from the scope thereof. The number of primary bores and pins may be modified as well as the number of secondary bores and pins as well as the arrangement of all these components.

The invention claimed is:

1. A method for manufacturing a turbomachine blade, the method comprising:
installing primary pins comprising a material other than a titanium-based alloy in primary bores of a core, the primary bores forming at least one polygon, and installing a secondary pin made of a titanium-based alloy in a secondary bore of the core;
making a stack of an upper wing skin, the core and a lower wing skin;
pressing the stack;
removing the primary pins from the primary bores;
removing the secondary pin from the secondary bore; and
taking the core out of the stack.

2. The method as claimed in claim 1, wherein at least one of the primary and secondary pins comprises a shank having a longitudinal shaft and a head protruding from the shank along a direction radial to the shaft.

3. The method as claimed in claim 1, comprising, after pressing the stack, performing in order: immobilizing the stack with respect to a support; removing the primary pins while the stack is immobilized on the support; immobilizing the stack on a tooling by attaching members traversing the primary bores; and while the stack is immobilized, removing the secondary pin and taking out the core.

4. The method as claimed in claim 1, wherein the secondary bore extends inside the polygon.

5. The method as claimed in claim 1, wherein the stack comprises a straight longitudinal edge, the secondary bore and a first of the primary bores extending in one and the same plane perpendicular to the longitudinal edge, the secondary bore extending between the first of the primary bores and the edge.

6. The method as claimed in claim 5, wherein the secondary bore and the first of the primary bores are separated by a distance of at least 10 mm.

7. The method as claimed in claim 1, wherein the primary pins are odd in number.

8. The method as claimed in claim 1, wherein the primary pins are at least two in number.

9. The method as claimed in claim 1, wherein the step of pressing the stack implements Hot Isostatic Pressing.

10. A stack comprising:
an upper wing skin;
a core;
a lower wing skin;
primary pins comprising a material other than a titanium-based alloy, the primary pins being housed in primary bores of the core and forming at least one polygon; and
a secondary pin made of a titanium-based alloy,
wherein the primary pins are housed in a secondary bore of the core.

11. The stack as claimed in claim 10, wherein at least one of the primary and secondary pins comprises a shank having a longitudinal shaft and a head protruding along a direction radial to the shaft.

* * * * *